United States Patent [19]

Tsubuko et al.

[11] 4,388,395

[45] Jun. 14, 1983

[54] LIQUID DEVELOPER FOR USE IN ELECTROPHOTOGRAPHY

[75] Inventors: Kazuo Tsubuko; Junichiro Hashimoto; Shinichi Kuramoto, all of Numazu; Makoto Okawara, Tokyo, all of Japan

[73] Assignee: Ricoh Co., Ltd., Tokyo, Japan

[21] Appl. No.: 339,544

[22] Filed: Jan. 15, 1982

[30] Foreign Application Priority Data

Jan. 21, 1981 [JP] Japan .................................. 56/7385

[51] Int. Cl.³ ........................................... G03G 9/12
[52] U.S. Cl. .................................... 430/114; 430/115
[58] Field of Search ........................ 430/114, 115, 116

[56] References Cited

U.S. PATENT DOCUMENTS

| | | | |
|---|---|---|---|
| 3,900,412 | 8/1975 | Kosel | 430/114 |
| 3,969,238 | 7/1976 | Tsuneda | 430/114 |
| 4,060,493 | 11/1977 | Tsubuko et al. | 430/113 X |
| 4,081,391 | 3/1978 | Tsubuko et al. | 430/114 X |
| 4,250,241 | 2/1981 | Tsubuko et al. | 430/114 |
| 4,264,699 | 4/1981 | Tsubuko et al. | 430/114 X |

*Primary Examiner*—Roland E. Martin, Jr.
*Attorney, Agent, or Firm*—Flynn, Thiel, Boutell & Tanis

[57] ABSTRACT

A liquid developer for use in electrophotography is disclosed which is prepared by dispersing a toner consisting essentially of a pigment or dye and a resin in a carrier liquid having a high insulating property and a low dielectric constant, wherein said resin is a nonaqueous dispersed resin obtained by effecting, in a nonaqueous solvent comprising an aliphatic hydrocarbon, the steps of:

(a) copolymerizing (1) a monomer A having the general formula I:

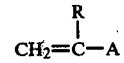

[wherein R is H or —CH$_3$, and A is —COOC$_n$H$_{2n+1}$ or —OC$_n$H$_{2n+1}$ (n is an integer of 6 to 20)] with (2) a polyfunctional monomer having two or more double bonds and (3) a monomer B having a glycidyl group or a vinyl monomer C having a carboxyl group, (b) esterifying the resulting copolymer with the monomer C when the monomer B was used in the step (a) and with the monomer B when the monomer C was used in the step (a) respectively, and (c) grafting the resulting esterified copolymer with a monomer D selected from the group consisting of compounds having the general formula II:

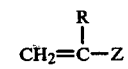

[wherein R is the same as previously stated and Z is —COOC$_m$H$_{2m+1}$ (m is an integer of 1 to 4), —OCOC$_{m'}$H$_{2m'+1}$ (m' is an integer of 1 to 6),

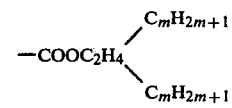

(m is the same as previously stated), —COOH, —COOC$_2$H$_4$OH or

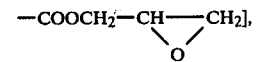

styrene, vinyl acetate, vinyltoluene, chlorostyrene, vinylpyrrolidone and vinylpyridine.

7 Claims, No Drawings

LIQUID DEVELOPER FOR USE IN ELECTROPHOTOGRAPHY

BACKGROUND OF THE INVENTION

1. Field of the Invention

The present invention relates to a liquid developer for use in electrophotography which is prepared by dispersing a toner consisting essentially of a pigment or dye and a nonaqueous dispersed resin uniformly in a carrier liquid having a high insulating property and a low dielectric constant.

2. Description of the Prior Art

The conventional liquid developers for use in electrophotography are prepared by dispersing, in a carrier liquid having a high insulating property and a low dielectric constant such as a petroleum aliphatic hydrocarbon, a toner consisting essentially of a pigment such as carbon black or dye and a synthetic or natural resin such as acrylic resin, phenol-denaturated alkyd resin, Staybelite resin, polymerized resin, synthetic rubber or the like and further added with a polarity controlling agent such as lecithin, metallic soap, linseed oil, higher fatty acid or the like. In the brand-new conventional liquid developer, the resin comprising the toner is adsorbed onto the pigment or dye and consequently the toner is permitted to hold a distinct positive or negative polarity as well as maintain a uniform dispersion stability. And, this toner causes electrophoresis according to the charge pattern of an electrostatic latent image formed on the surface of a photosensitive element during its developing step to thereby fix to the charge pattern and form an image thereon. However, such conventional liquid developers are defective in that because the resin and/or the polarity controlling agent diffuse and dissolve in the carrier liquid gradually with the lapse of time, the polarity becomes indistinct and ultimately aggregation takes place in the developer, whereby the fixability is deteriorated and consequently copied images are poor in sharpness. Still further, such conventional developers, once the toners used have aggregated, are utterly impossible to reuse, because it is impossible to re-disperse the aggregated toners.

SUMMARY OF THE INVENTION

The present invention provides a liquid developer for use in electrophotography which is capable of eliminating the above enumerated defects and is superior in the characteristics such as dispersion stability, fixability and re-dispersibility as well as adapted for a toner for use in an offset printing plate.

The present invention has been achieved on the basis of a series of investigations on the kinds and properties, in particular the solubility, of resins in a carrier liquid so that pigment or dye particles may attain their stable dispersibility and polarity controlling operation in the carrier liquid.

That is, the present invention provides a liquid developer for use in electrophotography which is preparred by dispersing a toner consisting essentially of a pigment or dye and a resin in a carrier liquid having a high insulating property and a low dielectric constant, wherein said resin is a nonaqueous dispersed resin obtained by effecting, in a nonaqueous solvent comprising an aliphatic hydrocarbon, the steps of:

(a) copolymerizing (1) a monomer A having the general formula I:

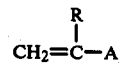

[wherein R is H or —CH$_3$, and A is —COOC$_n$H$_{2n+1}$ or —OC$_n$H$_{2n+1}$] (n is an integer of 6 to 20) with (2) a polyfunctional monomer having two or more double bonds and (3) a monomer B having a glycidyl group or a vinyl monomer C having a carboxyl group, (b) esterifying the resulting copolymer with the monomer C when the monomer B was used in the step (a) and with the monomer B when the monomer C was used in the step (a) respectively, and (c) grafting the resulting esterified copolymer with a monomer D selected from the group consisting of compounds having the general formula II:

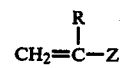

[wherein R is the same as previously stated and Z is —COOC$_m$H$_{2m+1}$ (m is an integer of 1 to 4), —O-COC$_{m'}$H$_{2m'+1}$ (m' is an integer of 1 to 6),

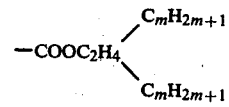

(m is the same as previously stated), —COOH, —COOC$_2$H$_4$OH or

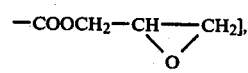

styrene, vinyl acetate, vinyltoluene, chlorostyrene, vinylpyrrolidone and vinylpyridine.

DETAILED DESCRIPTION OF THE PREFERRED EMBODIMENTS OF THE INVENTION

First, explanation will be made as to the nonaqueous dispersed resin (which is sometimes called the nonaqueous resin dispersion).

The monomer A used in this resin is a component which is polymerized and then is capable of effecting solvation with a non-aqueous solvent. In the concrete, as said monomer there can be enumerated lauryl, stearyl, cetyl, dodecyl, 2-ethylhexyl, octyl or hexyl ester and the like of acrylic acid or methacrylic acid.

The polyfunctional monomer having two or more double bonds is a component with which the monomer A and monomer B or monomer C copolymerize and on which the monomer D grafts. In the concrete, as said polyfunctional monomer there can be enumerated as follows:

(1) Polyfunctional acrylate or methacrylate

Examples of monoesters:
methoxy diethylene glycol methacrylate, methoxy tetraethylene glycol methacrylate, methoxy diethylene glycol acrylate, methoxy polyethylene glycol acrylate, and methoxy polyethylene glycol methacrylate.

Examples of diesters:

ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane glycol dimethacrylate, neopentyl glycol dimethacrylate, dipropylene glycol dimethacrylate, polypropylene glycol dimethacrylate, 2,2'-bis(4-methacryloxydiethoxyphenyl)propane, polyethylene glycol diacrylate, polyethylene glycol dimethacrylate, 1,3-butylene glycol diacrylate, 1,6-hexane glycol diacrylate, neopentyl glycol diacrylate, polypropylene glycol diacrylate, 2,2'-bis(4-acryloxypropyloxyphenyl)propane and 2,2'-bis(4-acryloxydiethoxyphenyl)propane.

Examples of triesters:
trimethylolpropane trimethacrylate, trimethylolethane trimethacrylate, trimethylolpropane triacrylate, trimethylolethane triacrylate, tetramethylolmethane triacrylate (triester content: about 30%), and trimethylolpropane mono-coconut oil diacrylate.

Examples of tetraesters:
tetramethylolmethane tetracrylate

The others:
dibromoneopentyl glycol dimethacrylate and 2,3-dibromopropyl acrylate.

(2) Compounds having the following general formula III

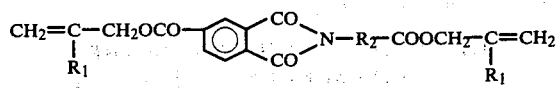

(wherein $R_1$, which may be the same or differnt, is a hydrogen atom or a methyl group, and $R_2$ is a divalent aliphatic hydrocarbon, alicyclic hydrocarbon or aromatic hydrocarbon radical.)

For instance, said compounds include 4-allyloxycarbonyl-N-(allyloxycarbonylmethyl)phthalimide, 4-allyloxycarbonyl-N-(2'-allyloxycarbonylethyl)phthalimide, 4-allyloxycarbonyl-N-(3'-allyloxycarbonylpropyl)phthalimide, 4-allyloxycarbonyl-N-(2'-methyl-3'-allyloxycarbonylpropyl)phthalimide, 4-allyloxycarbonyl-N-(5'-allyloxycarbonylpentyl)phthalimide, 4-allyloxycarbonyl-N-(3'-allyloxycarbonylphenyl)phthalimide, 4-allyloxycarbonyl-N-(4'-allyloxycarbonylphenyl)phthalimide, 4-allyloxycarbonyl-N-[4'-(p-allyloxycarbonylphenyl)phenyl]-phthalimide, 4-allyloxycarbonyl-N-(6'-allyloxycarbonyl-2'-naphthyl)phthalimide, 4-allyloxycarbonyl-N-(5'-allyloxycarbonyl-1'-naphthyl)phthalimide, 4-allyloxycarbonyl-N-(3'-allyloxycarbonylcyclohexyl)phthalimide, 4-allyloxycarbonyl-N-(4'-aryloxycarbonylcyclohexyl)phthalimide, 4-methallyloxycarbonyl-N-(methallyloxycarbonylmethyl)phthalimide, 4-methallyloxycarbonyl-N-(allyloxycarbonylmethyl)phthalimide, 4-allyloxycarbonyl-N-(methallyloxycarbonylmethyl)phthalimide, 4-methallyloxycarbonyl-N-(2'-methallyloxycarbonylethyl)phthalimide, 4-methallyloxycarbonyl-N-(5'-allyloxycarbonylpentyl)phthalimide, 4-methallyloxycarbonyl-N-(3'-methallyloxycarbonylphenyl) phthalimide, 4-allyloxycarbonyl-N-(4'-methallyloxycarbonylphenyl) phthalimide, 4-methallyloxycarbonyl-N-(6'-methallyloxycarbonyl-2'-naphthyl)phthalimide, 4-methallyloxycarbonyl-N-(5'-methallyloxycarbonyl-1'-naphthyl)phthalimide, 4-methallyloxycarbonyl-N-(3'-allyloxycarbonylcyclohexyl)phthalimide, 4-methallyloxycarbonyl-N-(4'-allyloxycarbonylcyclohexyl)phthalimide and the like.

(3) Compounds having the following general formula IV:

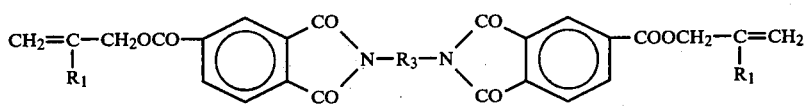

[wherein $R_1$ is the same as defined in the general formula III, and $R_3$ is a divalent aliphatic radical (excluding a substituted or non-substituted methylene group), an alicyclic radical or an aromatic hydrocarbon radical.]

For instance, said compounds include ethylene-bis(4-allyloxycarbonylphthalimide), trimethylene-bis(4-allyloxycarbonylphthalimide), hexamethylene-bis(4-allyloxycarbonylphthalimide), dodecamethylene-bis(4-allyloxycarbonylphthalimide), 3'-methylhexamethylene-bis(4-allyloxycarbonylphthalimide), m-phenylene-bis(4-allyloxycarbonylphthalimide), p-phenylene-bis(4-allyloxycarbonylphthalimide), p-p'-diphenylene-bis(4-allyloxycarbonylphthalimide, p-p'-diphenylether-bis(4-allyloxycarbonylphthalimide), p-p'-diphenylsulfone-bis(4-allyloxycarbonylphthalimide), p,p'-diphenylmethane-bis(4-allyloxycarbonylphthalimide), 2',6'-naphthalene-bis(4-allyloxycarbonylphthalimide), 1',5'-naphthalene-bis(4-allyloxycarbonylphthalimide), 1',3'-cyclohexane-bis(4-allyloxycarbonylphthalimide), 1',4'-cyclohexane-bis(4-allyloxycarbonylphthalimide), 4',4''-dicyclohexylmethane-bis(4-allyloxycarbonylphthalimide), ethylene bis(4-methallyloxycarbonylphthalimide), trimethylene bis(4-methallyloxycarbonylphthalimide), hexamethylene bis(4-methallyloxycarbonylphthalimide), dodecamethylene bis(4-methallyloxycarbonylphthalimide), 3'-methylhexamethylene bis(4-methallyloxycarbonylphthalimide), m-phenylene bis(4-methallyloxycarbonylphthalimide), p-phenylene bis(4-methallyloxycarbonylphthalimide), p,p'-diphenylene bis(4-methallyloxycarbonylphthalimide), p,p'-diphenylether bis(4-methallyloxycarbonylphthalimide), p,p'-diphenylsulfone bis(4-methallyloxycarbonylphthalimide), p,p'-diphenylmethane bis(4-methallyloxycarbonylphthalimide), 2',6'-naphthalene bis(4-methallyloxycarbonylphthalimide), 1',5'-naphthalene bis(4-methallyloxycarbonylphthalimide), 1',3'-cyclohexane bis(4-methallyloxycarbonylphthalimide), 1',4',-cyclohexane bis(4-methallyloxycarbonylphthalimide), 4',4''-dicyclohexylmethane bis(4-methallyloxycarbonylphthalimide) and the like.

(4) Compounds having the following general formula V

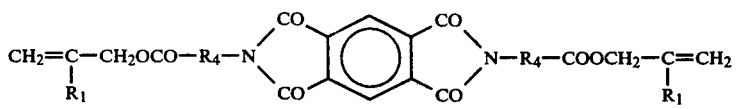

(wherein $R_1$ is the same as defined in the general formula III, and $R_4$ is a divalent aliphatic radical, an alicyclic radical or an aromatic hydrocarbon radical.)

For instance, said compounds include N,N'-bis(allyloxycarbonylmethyl)pyromellitic imide, N,N'-bis(2-allyloxycarbonylethyl)pyromellitic imide, N,N'-bis(3-allyloxycarbonylpropyl) pyromellitic imide, N,N'-bis(5-allyloxycarbonylpentyl)pyromillitic imide, N,N'-bis(3-allyloxycarbonylphenyl)pyromellitic imide, N,N'-bis(4-allyloxycarbonylphenyl)pyromellitic imide, N-N'-bis[4-(p-allyloxycarbonylphenyl)phenyl]pyromellitic imide, N,N'-bis(6-allyloxycarbonyl-2-naphthyl)pyromellitic imide, N,N'-bis(5-allyloxycarbonyl-1-naphthyl)pyromellitic imide, N,N'-bis(3-allyloxycarbonylcyclohexyl)pyromellitic imide, N,N'-bis(4-allyloxycarbonylcyclohexyl)pyromellitic imide, N,N'-bis(methallyloxycarbonylmethyl)pyromellitic imide, N,N'-bis(2-methallyloxycarbonylethyl)pyromellitic imide, N,N'-bis(5-methallyloxycarbonylpentyl)pyromellitic imide, N,N'-bis(3-methallyloxycarbonylphenyl)pyromellitic imide, N,N'-bis(4-methallyloxycarbonylphenyl)pyromellitic imide, N,N'-bis(4-methallyloxycarbonylphenyl)pyromellitic imide, N,N'-6-methallyloxycarbonyl-2-naphthyl)pyromellitic imide, N,N'-bis(5-methallyloxycarbonyl-1-naphthyl)pyromellitic imide, N,N'-bis(4-methallyloxycarbonylcyclohexyl)pyromellitic imide and the like.

The monomer B having a glycidyl group is a component which copolymerizes with the monomer A and undergoes an esterification reaction with the monomer C as well as acts to exceedingly enhance and promote the cross-linking reactivity at the time of heating. In the concrete, said monomer B includes glycidyl acrylate, glycidyl methacrylate, acryl glycidyl ether, glycidyl crotonate, monoglycidyl itaconate, monoglycidyl maleate, diglycidyl fumarate, monoglycidyl fumarate and the like.

The mononer C, like the monomer B, is a component which copolymerizes with the monomer A and undergoes an esterification reaction with the monomer B as well as acts to exceedingly enhance and promote the cross-linking reactivity at the time of heating. In the present invention, the polar groups of monomers B and C having such high reaction activity and catalytic action copolymerize or undergo esterification reaction with the solvation polymer consisting of the monomer A. In the concrete, as the monomer C there can be enumerated as follows.

Examples of aliphatic monomers:
Acrylic acid, methacrylic acid, itaconic acid, fumaric acid and maleic acid.

Examples of aromatic monomers:
Compounds having the following formulas:

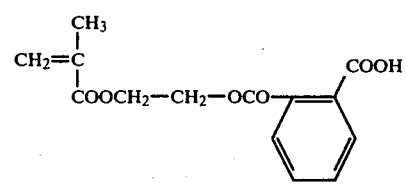

1

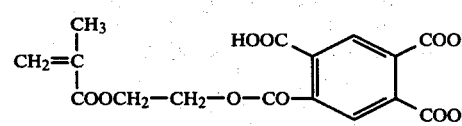

2

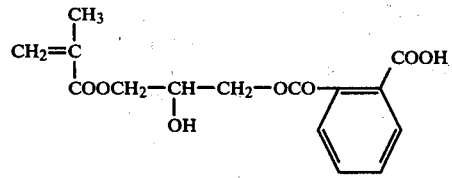

3

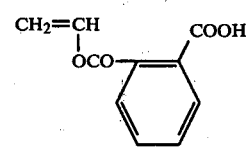

4

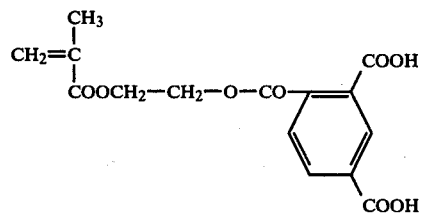

5

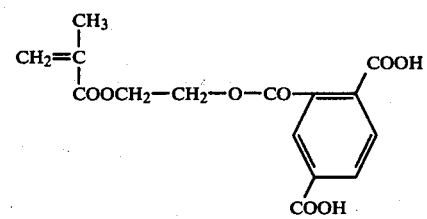

6

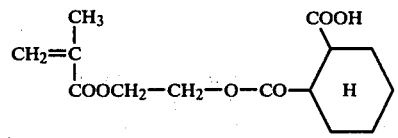

7

Of these compounds, those represented by the formulas No. 4, etc. can be produced by ester exchange between the alkyl group of an acrylic ester monomer and the carboxyl group of an aromatic polyhydric carboxylic acid or its anhydrides or their derivatives. For instance, the compound represented by the formula No. 4 can be obtained by the reaction as shown below:

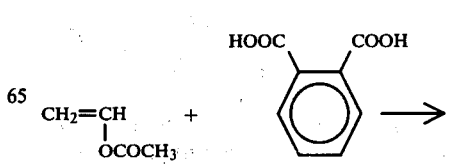

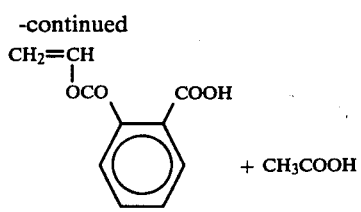

The acrylic ester monomer referred to herein includes, for instance, methyl acrylate, methyl methacrylate, ethyl acrylate, ethyl methacrylate, n-butyl acrylate, iso-butyl methacrylate, hydroxyethyl methacrylate, hydroxypropyl methacrylate, glycidyl methacrylate, glycidyl acrylate and the like. As the aromatic polyhydric carboxylic acid or anhydrides thereof there can be enumerated phthalic acid, isophthalic acid, terephthalic acid, hemimellitic acid, trimellitic acid, trimesic acid, mellophanic acid, prehnitylic acid, pyromellitic acid, benzene-pentacarboxylic acid, mellitic acid, phthalic anhydride, hemimellitic anhydride, trimellitic anhydride and the like.

The compounds represented by the formulas No. 3, etc. can be obtained by the esterification reaction between a polymerizing monomer having a glycidyl group corresponding to the monomer B used in the present invention and the aromatic polyhydric carboxylic acid or its anhydrides or their derivatives as previously stated. For instance, the compound represented by the formula No. 3 can be obtained by the under mentioned reaction:

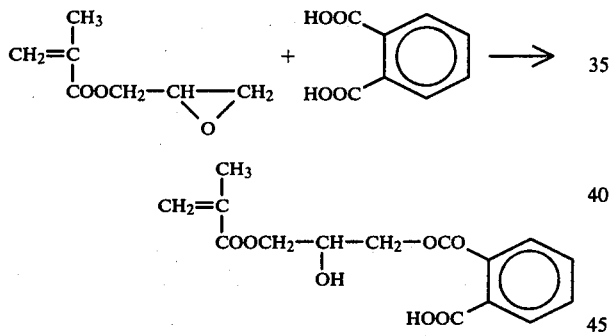

Further, the compounds represented by the formula No. 1 can be obtained by the esterification reaction between a polymerizing monomer having a hydroxyl group and the above mentioned aromatic polyhydric carboxylic acid or its anhydrides or their derivatives. For instance, the compound represented by the formula No. 1 can be obtained by the undermentioned reaction:

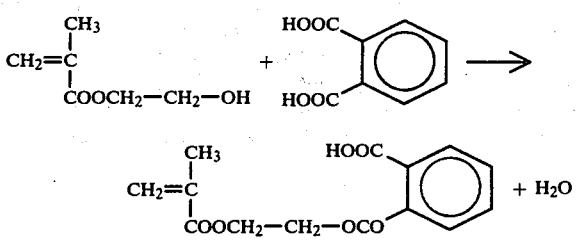

The polymerizing monomer having a hydroxyl group referred to herein includes 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, N-methylolacrylamide, N-methylolmethacrylamine, acrylate or methacrylate of polyethylene glycol, allylalcohol, methaallylalcohol and the like.

The monomer D used in the final step of the present invention is a graft-copolymerizing component and a monomer having the property of becoming substantially insoluble in a nonaqueous solvent after having been polymerized. In the concrete, the compounds of the general formula II belonging to the said monomer D include methyl methacrylate, methyl acrylate, ethyl acrylate, butyl acrylate, isobutyl methacrylate and the like. As the monomer D there can be used, in addition thereto, styrene, vinyl acetate, vinyl toluene, vinyl pyrrolidone, vinylpyridine and chlorostyrene as previously stated.

Further, the aliphatic hydrocarbon used as the nonaqueous solvent includes n-hexane, isooctane, isododecane, n-nonane and the like, and additionally includes commercially available products such as Isopar G, H, L, M produced by Esso Co., Shellzole 71 produced by Shell Oil Co., and the like.

The copolymerization step in the present invention is effected by copolymerizing the monomer A, the polyfunctional monomer having two or more double bonds and monomer B (or monomer C) in an aliphatic hydrocarbon solvent at a temperature of 60° to 130° C. in the presence of a polymerization initiator such as peroxide, azo compound or the like. The quantities of said polyfunctional monomer and monomer B (or monomer C) suitably used herein are in the range of about 0.0001 to 0.5, 0.001 to 0.5 part by weight per 1 part by weight of monomer A, respectively. The monomer A is a monomer which contributes to the dispersion stability and fixability of the resulting resin, while the monomer B (or monomer C) is a monomer which forms a graft active point of said resin. And, the polyfunctional monomer is a monomer which forms an active point for the cross-linking or grafting reaction of resin. The polyfunctional monomer, when polymerized, forms double-bond portions, and another monomer forms a graft bond with a part of said double-bond portions, thereby enhancing the total molecular weight of the resulting polymer. And, the remaining double-bond portions, which have an affinity to a coloring agent and a solvent, act to promote the dispersibility of the polymer in a liquid.

The succeeding esterification step is carried out by esterifying the same reaction system added with the monomer C (or monomer B) at a temperature ranging from 50° to 100° C. in the presence of an esterifying catalyst such as lauryldimethylamine or the like. The suitable quantity of the monomer C (or monomer B) used herein is about 0.001 to 0.5 part by weight per 1 part by weight of the copolymer.

The final grafting step is carried out by grafting the same reaction system added with the monomer D in succession at a temperature of 60° to 100° C. in the presence of the above mentioned polymerization initiator. The suitable quantity of the monomer D used herein is about 0.01 to 1.0 part by weight per 1 part by weight of the esterified copolymer.

Generally speaking, in the case of introducing a carboxyl group into a polymer, in particular an acrylic resin, copolymerization is conducted between acrylic acid, methacrylic acid, crotonic acid and the like. However, the carboxyl group introduced in such a way is located in the vicinity of the main chain of the polymer and moreover is an aliphatic carboxyl group in any case. In other words, when the carboxyl group is located in the vicinity of the main chain of the polymer, this polar group is subjected to a steric hindrance by the polymer's main chain and substituent groups belonging to this main chain and thus the reactivity is deteriorated markedly. In addition, this aliphatic carboxyl group has a low dissociation constant and thus deficient in the reactivity as acid. In contradiction to this, when an aromatic carboxyl group is introduced, the aromatic carboxyl group of the resulting copolymer is located at a position freed from a steric hindrance caused by the main chain of the polymer, and further has a dissociation constant higher than that of the aliphatic carboxyl group. The monomer C used in the present invention has the aromatic carboxyl group as mentioned above and therefore is highly reactive and is liable to form a crosslinking structure in the resulting resin. Due to this, the process of the present invention can synthesize a resin having a high esterifying rate and a narrow molecular weight distribution at the resin preparation stage, in cooperation with the high reaction activity and catalytic activity of the monomer A and monomer B. Accordingly, when this resin is mixed with pigment, there is scarcely caused the aggregation of pigment because the presence of unreacted carboxyl group and glycidyl group can be reduced and there can be obtained high storage stability and water resisting property (—COOH and

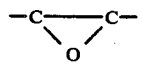

do not remain) and reduced sedimentation at the time of storage because a reaction of the resin per se (for instance, esterification or the like) does not proceed.

In the present invention, a wax having a softening point of 60° to 130° C. or polyolefin having a low molecular weight (MW=100 to 5,000 or so), which will be referred to as a wax-like substance, may be added, in any of the above mentioned steps, preferably in a quantity up to 50% by weight relative to the final product (graft-copolymer). This wax-like substance does not exert a bad influence on the quality of the product itself because said substance does not take part directly in the reaction, but rather may enhance the re-dispersibility of the developer because said substance has a specific gravity which is closely akin to that of the resin to be produced.

In the concrete, the wax-like substance includes the commercially available articles as enumerated below:

| The name of company | The name of article | Softening point [°C.] |
|---|---|---|
| Union Carbide (U.S.A.) | DYNI | 102 |
| | DYNF | 102 |
| | DYNH | 102 |
| | DYNJ | 102 |
| | DYNK | 102 |
| Allied Chemical (U.S.A.) | AC Polyethylene 6 & 6A | 106 |
| Du Pont (U.S.A.) | Alathon- 3 | 103 |
| | 10 | 96 |
| | 12 | 84 |
| | 14 | 80 |
| | 16 | 95 |
| | 20 | 86 |

-continued

| The name of company | The name of article | Softening point [°C.] |
|---|---|---|
| | | 22 | 84 |
| | 25 | 96 |
| Monsanto (U.S.A.) | Orizon 805 | 116 |
| | 705 | 116 |
| | 50 | 126 |
| Philips (U.S.A.) | Marlex 1005 | 92 |
| Sanyo Kasei Kagaku (K.K.) | Sanwax 131P | 108 |
| | 151P | 107 |
| | 161P | 111 |
| | 165P | 107 |
| | 171P | 105 |
| | E200 | 95 |
| Quaker State Oil | QS - wax | 65 |
| Junsei Yakuhin (K.K.) | Paraffin wax | 60 to 90 |

Preparation examples of the dispersed resin will be given below, in which all parts are by weight unless otherwise indicated.

PREPARATION EXAMPLE 1

200 parts of isooctane were put in a four-way flask equipped with a thermometer, a stirrer and a condenser, and heated to 90° C. on an oil bath. Thereafter, the same was further added with 100 parts of stearylmethacrylate, 3 parts of ethylene glycol dimethacrylate, 30 parts of glycidyl methacrylate and 5 parts of azobisisobutyronitrile and subjected to 5 hours' copolymerization reaction at the same temperature as stated above. Next, 0.5 part of hydroquinone, 20 parts of β-methacryloxyethyl acid phthalate (the compound of the formula No. 1) and 0.02 part of lauryldimethylamine were added thereto, and the same was subjected to 5 to 10 hours' esterification reaction at 85° C. Further, 50 parts of styrene and 1 part of benzoyl peroxide were put in the resulting product and subjected to graft-polymerization reaction.

The resulting graft-copolymer dispersion was further added with 50 parts of AC Polyethylene 6A (produced by Allied Chemical Co.) and maintained at a dissolved state at 80° to 90° C. for 4 hours. Then, it was removed from the oil bath and water-cooled to thereby obtain a nonaqueous resin dispersion.

PREPARATION EXAMPLE 2

200 parts of Isopar G were put in the same flask as used in Preparation Example 1, and heated to 90° C. on an oil bath. Thereafter, 100 parts of cetylmethacrylate, 5 parts of 1,3-butylene glycol diacrylate, 20 parts of β-methacryloxyethyl acid hexahydrophthalate (the compound of the formula No. 7) and 3 parts of benzoyl peroxide were put therein and the same was subjected to 4 hours' copolymerization reaction. Next, 1 part of hydroquinone, 10 parts of glycidyl methacrylate and 0.1 part of dodecylamine were added thereto, and the same was subjected to 10 hours' esterification reaction at 80° C. Further, 30 parts of methyl methacrylate and 0.05 part of azobisisobutyronitrile were put therein and the same was subjected to 3 hours' graft-polymerization at 90° C.

The resulting graft-copolymer dispersion was further added with 30 parts of Sanwax E200 (low molecular weight polyethylene produced by Sanyo Kasei K.K.), and the same was heated at 90° C. for 1 hour, thereby obtaining a nonaqueous resin dispersion.

PREPARATION EXAMPLE 3

300 parts of n-hexane were put in the same flask as used in Preparation Example 1, and heated to 80° C. Thereafter, 100 parts of laurylmethacrylate, 8 parts of tetramethylolmethane tetraacrylate, 25 parts of glycidyl acrylate and 3 parts of lauroyl peroxide were added thereto, and the same was subjected to 5 hours' copolymerization reaction at the same temperature. Further, 0.1 part of hydroquinone, 0.002 part of lauryldimethylamine and 20 parts of the compound of the formula No. 2 were put therein and the same was subjected to 10 hours' esterification reaction at the above mentioned temperature. Further, 30 parts of vinyl acetate were added thereto, thereby obtaining a graft-copolymer dispersion.

COMPARATIVE EXAMPLE 1

The same procedure as Preparation Example 1 was repeated except that the ethylene glycol dimethacrylate was not employed.

COMPARATIVE EXAMPLE 2

The same procedure as Preparation Example 2 was repeated except that 1,3-butyrene glycol diacrylate was not employed.

COMPARATIVE EXAMPLE 3

The same procedure as Preparation Example 3 was repeated except that the tetramethylolmethane tetracrylate was not employed.

Thus obtained products were measured with reference to the rate of esterification, rate of polymerization, grain size and dispersion stability. The obtained results are as shown below:

PREPARATION EXAMPLE 5

200 parts of Isopar G were put in the same flask as used in Preparation Example 1, and heated to 90° C. on an oil bath. Thereafter, 100 parts of cetylmethacrylate, 5 parts of 4-allyloxycarbonyl-N-[4'-(p-allyloxycarbonylphenyl)]phthalimide, 20 parts of $\beta$-methacryloxyethyl acid hexahydrophthalate (the compound of the formula No. 7) and 3 parts of benzoyl peroxide were put therein and the same was subjected to 4 hours' copolymerization reaction at 100° C.. Next, 1 part of hydroquinone, 10 parts of glycidyl methacrylate and 0.01 part of dodecylamine were added thereto, and the same was subjected to 10 hours' esterification reaction at 80° C. Further, 30 parts of methyl methacrylate and 0.05 part of azobisisobutyronitrile were put therein and the same was subjected to 3 hours' graft-polymerization at 90° C.

The resulting graft-copolymer dispersion was further added with 30 parts of Sanwax E200 (low molecular weight polyethylene produced by Sanyo Kasei K.K.), and the same was heated at 90° C. for 1 hour, thereby obtaining a nonaqueous resin dispersion.

PREPARATION EXAMPLE 6

300 parts of n-hexane were put in the same flask as used in Preparation Example 1, and heated to 80° C. Thereafter, 100 parts of laurylmethacrylate, 8 parts of 4-methallyloxycarbonyl-N-(6'-methallyloxycarbonyl-2'-naphthyl)phthalimide, 25 parts of glycidyl acrylate and 3 parts of lauroyl peroxide were added thereto, and the same was subjected to 5 hours' copolymerization reaction at the same temperature. Further 0.1 part of

|  | Preparation Example 1 | Comparative Example 1 | Preparation Example 2 | Comparative Example 2 | Preparation Example 3 | Comparative Example 3 |
|---|---|---|---|---|---|---|
| Rate of graft (%) | 40 | 10 | 46 | 10 | 50 | 18 |
| Rate of polymerization (%)*[1] | 96.5 | 95.8 | 95.8 | 95.0 | 98.2 | 94.5 |
| Grain size ($\mu$) | 0.1 to 0.2 | 1.0 to 20 | 0.2 to 0.3 | 5 to 10 | 0.5 to 1.0 | 20 to 30 |
| Dispersion stability*[2] | good | bad | good | bad | good | bad |

(Notes)
*[1]The rate of polymerization of a graft-copolymer
*[2]Measurement was taken of the presence of sedimentation after having been left standing for 30 days. The "good" denotes the case where no sedimentation occurs, while the "bad" denotes the case where sedimentation occurs.

PREPARATION EXAMPLE 4

200 parts of Isopar H were put in the same flask as used in Preparation Example 1, and heated to 90° C. on an oil bath. Thereafter, 100 parts of stearylmethacrylate, 15 parts of 4-allyloxycarbonyl-N-(2'-allyloxycarbonylethyl)phthalimide, 30 parts of glycidyl methacrylate and 5 parts of azobisisobutyronitrile were put therein and the same was subjected to 5 hours' copolymerization reaction at said temperature. Next, 0.5 part of hydroquinone, 20 parts of $\beta$-methacryloxyethyl acid phthalate (the compound of the formula No. 1) and 0.02 part of lauryldimethylamine were added thereto, and the same was subjected to 5 to 10 hours' esterification reaction at 85° C. Further, 50 parts of styrene and 1 part of benzoyl peroxide were put therein and the same was subjected to graft-polymerization reaction.

The resulting graft-copolymer dispersion was further added with 50 parts of AC Polyethylene 6A (produced by Allied Chemical Co.) and maintained at a dissolved state at 80° to 90° C. for 4 hours. Then, it was removed from the oil bath and water-cooled to thereby obtain a nonaqueous resin dispersion.

hydroquinone, 0.002 part of lauryldimethylamine and 20 parts of a compound of the formula No. 2 were put therein and the same was subjected to 10 hours' esterification reaction at the above mentioned temperature. Further, 30 parts of vinyl acetate were added thereto, thereby obtaining a graft-copolymer dispersion.

The obtained products have the properties as shown below.

|  | Preparation Example 4 | Preparation Example 5 | Preparation Example 6 |
|---|---|---|---|
| Rate of graft (%) | 46 | 38 | 29 |
| Rate of polymerization (%) | 93.8 | 96.4 | 92.5 |
| Grain size ($\mu$) | 0.5 to 0.8 | 0.4 to 0.5 | 0.3 to 0.4 |
| Dispersion stability | good | good | good |

PREPARATION EXAMPLE 7

200 parts of isooctane were put in the same flask as used in Preparation Example 1, and heated to 90° C. on an oil bath. Thereafter, 100 parts of stearylmethacrylate, 10 parts of N,N'-bis(allyoxycarbonylmethyl)pyromellitic imide, 30 parts of glycidyl methacrylate and 5 parts of azobisisobutyronitrile were put therein and the same was subjected to 5 hours' copolymerization reaction at said temperature. Next, 0.5 part of hydroquinone, 20 parts of β-methacryloxyethyl acid phthalate (the compound of the formula No. 1) and 0.02 part of lauryldimethylamine were added thereto, and the same was subjected to 5 to 10 hours' esterification reaction at 85° C. Further, 50 parts of styrene and 1 part of benzoyl peroxide were put therein and the same was subjected to graft-polymerization reaction.

The resulting graft-polymer dispersion was further added with 50 parts of AC Polyethylene 6A (produced by Allied Chemical Co.) and maintained at a dissolved state at 80° to 90° C. for 4 hours. Then, it was removed from the oil bath and water-cooled to thereby obtain a nonaqueous resin dispersion.

PREPARATION EXAMPLE 8

200 parts of Isopar G were put in the same flask as used in Preparation Example 1, and heated to 90° C. on an oil bath. Thereafter, 100 parts of cetylmethacrylate, 5 parts of N,N'-bis(3-allyloxycarbonylcyclohexyl)pyromellitic imide, 20 parts of β-methacryloxyethyl acid hexahydrophthalate (the compound of the formula No. 7) and 3 parts of benzoyl peroxide were put therein and the same was subjected to 4 hours' copolymerization reaction at 100° C. Next, 1 part of hydroquinone, 10 parts of glycidyl methacrylate and 0.01 part of dodecylamine were added thereto, and the same was subjected to 10 hours' esterification reaction at 80° C. Further, 30 parts of methyl methacrylate and 0.05 part of azobisisobutyronitrile were put therein and the same was subjected to 3 hours' graft polymerization reaction at 90° C.

The resulting graft-copolymer dispersion was further added with 30 parts of Sanwax E200 (low molecular weight polyethylene produced by Sanyo Kasei K.K) and the same was heated at 90° C. for 1 hour, thereby obtaining a nonaqueous resin dispersion.

PREPARATION EXAMPLE 9

300 parts of n-hexane were put in the same flask as used in Preparation Example 1 and heated to 80° C. Thereafter, 100 parts of laurylmethacrylate, 8 parts of tetramethylolmethane tetraacrylate, 30 g of N,N'-bis(4-methallyloxycarbonylphenyl)pyromellitic imide, 25 parts of glycidyl acrylate and 3 parts of lauroyl peroxide were added thereto, and the same was subjected to 5 hours' copolymerization reaction at the same temperature. Further, 0.1 part of hydroquinone, 0.002 part of lauryldimethylamine and 20 parts of the compound of the formula No. 2 were put therein and the same was subjected to 10 hours' esterification reaction at the above mentioned temperature. Further, 30 parts of vinyl acetate was added thereto, thereby obtaining a graft-copolymer dispersion.

The obtained products have the properties as shown below.

| | Preparation Example 7 | Preparation Example 8 | Preparation Example 9 |
|---|---|---|---|
| Rate graft (%) | 42 | 38 | 44 |
| Rate of polymerization (%) | 98.0 | 96.6 | 98.9 |
| Grain size (μ) | 0.2 to 0.6 | 0.1 to 0.3 | 0.2 to 0.4 |
| Dispersion stability | good | good | good |

The nonaqueous type thermo-plastic resin obtained as mentioned above, the specific gravity of which is closely akin to that of the dispersion medium (1.1 to 1.2 in the case of a conventional resin, for instance, such as acrylic resin, while about 0.85 to 1.05 in the case of the resin dispersion of the present invention), exhibits an excellent dispersion stability in the carrier liquid of the same kind as the dispersion medium, and is superior in fixability because some portion thereof is soluble in the carrier liquid. Further, the resin of the present invention is substantially free from the occurrence of aggregation with the lapse of time, and even if aggregation occurs, can readily re-disperse and maintain a predominantly distinct polarity.

As the pigments and dyes suitably used in the present invention there can be enumerated conventional ones, for instance, such as Alkali Blue, Phthalocyanine Green, Oil Blue, spirit black, carbon black, Oil Violet, Phthalocyanine Blue, Benzidine Yellow, Methyl Orange, Brilliant Carmine, Fast Red, Methyl Violet and the like.

Further, as the carrier liquid suitably used in the present invention there can be enumerated those of the same kind as the above mentioned nonaqueous solvent, paraffin- or isoparaffin-type aliphatic hydrocarbon or its halogen derivatives having $10^9$ Ωcm or more electric resistance and 3 or less dielectric constant, for instance, the under mentioned goods on the market such as Isopar E, G, H, L, K, Naphtha No. 6, Solvesso 150, DAIFURON and the like. In addition thereto, n-hexane, ligroin, n-heptane, iso-octane, n-octane, carbon tetrachloride and the like are usable as the carrier liquid. The above aliphatic hydrocarbon or its halogen derivatives can be used singly or in combination.

The developer according to the present invention may be prepared by dispersing a mixture of 0.1 to 10 parts by weight of pigment (dye) and a proper quantity of carrier liquid in 1 part by weight of the thus obtained resin dispersion by using a dispersion means such as a ball mill. In this case, a polarity controlling agent may be added in a very small quantity as occasion demands, but in view of the fact that the resin dispersion of the present invention has a predominantly distinct polarity and is superior in dispersion stability as previously stated, there will be no special necessity of adding the polarity controlling agent. Any conventional polarity controlling agent can be used in the present invention.

The developer according to the present invention has the following characteristics:

(1) Because a large quantity of resin is adsorbed onto the pigment or dye particles, the toner is allowed to have a uniform particle diameter of about 0.2 to 1.0μ, and the use of this toner can produce copies of a high image density.

(2) Because a polar polymer is adsorbed onto the pigment or dye particles, the stability of the toner can be maintained for a long period of time (10 months or more).

(3) A relatively large quantity of resin adheres to the surface of the pigment or dye, while a small quantity of resin isolates in the carrier liquid. This isolated resin per se migrates to thereby improve the image fixability.

(4) Because the toner is very hydrophobic, the use of this toner for printing plates can produce printed matter having a high image density.

(5) The developer of the present invention is also superior in the transferability and optimum for use in electrostatic transfer, press transfer, magnetic transfer, etc.

EXAMPLES

EXAMPLE 1

| | |
|---|---|
| Dispersed resin (obtained by Preparation Example 1) | 50 g |
| Carbon Black Mitsubishi #100 (produced by Mitsubishi Carbon K.K.) | 5 g |
| Special Black EB (produced by Orient Kagaku K.K.) | 1 g |
| Isopar H | 100 g |

A mixture of the above composition was dispersed for 40 hours by means of a ball mill to thereby obtain a concentrated toner. 10 g of this concentrated toner was dispersed in 2 l of Isopar H to prepare a liquid developer. Next, an electrostatic latent image was found on a commercially available electrophotographic copying paper (zinc oxide-resin dispersed type) in a conventional manner. Thereafter, this latent image was developed by means of said developer, thereby obtaining a copy having an image density of 1.20 and a superior fixability as compared with usual ones. In order to investigate the stability of the toner, this copy was subjected to 7 days' forced deterioration test to find that it remained almost unchanged as compared with its condition before the test.

EXAMPLE 2

| | |
|---|---|
| Dispersed resin (obtained by Preparation Example 2) | 30 g |
| Carbon Black Mitsubishi #44 | 10 g |
| Isopar H | 100 g |

A mixture of the above composition was dispersed for about 40 hours by means of a ball mill to thereby obtain a concentrated toner. 10 g of this concentrated toner was dispersed in 2 l of Isopar H to prepare a liquid developer. Next, an electrostatic latent image was formed on a commercially available electrophotographic copying paper in a conventional manner. Thereafter, this latent image was developed by means of said developer, thereby obtaining a copy having the same efficiencies as Example 1. Further, this copy was subjected to desensitizing treatment. Printing was made using the thus treated copy as an offset master to obtain clear printed matter. Especially because the toner was highly hydrophobic, the image area of the offset master was well inked with the result that the finishing density of the printed image area was 1.25 or more. Still further, because the toner was well fixed onto the offset master, it was possible to print 30,000 copies. The stability of the developer was the same as Example 1.

EXAMPLE 3

| | |
|---|---|
| Dispersed resin (obtained by Preparation Example 3) | 50 g |
| Benzidine Yellow GY (produced by Sanyo Kasei K.K.) | 10 g |
| Isopar G | 100 g |

A mixture of the above composition was dispersed for 60 hours by means of a ball mill to prepare a blue toner for use in color printing. The dispersed resin used herein is one capable of imparting conspicuous luster and transparency to the toner image as well as serviceable for color-reproduction with high fidelity, because said resin has been adsorbed strongly by Benzidine Yellow GY in the toner.

EXAMPLE 4

| | |
|---|---|
| Dispersed resin obtained by Preparation Example 1 | 25 g |
| Microlith Blue (produced by Ciba Co.) | 5 g |
| Isooctane | 100 g |

A mixture of the above composition was dispersed for 60 hours by means of a ball mill to prepare a cyan toner for use in color-copying. The resulting toner was found to have a superior transparency, impart a good luster to the image and exhibit a superior color-reproducibility as described in Example 3. Further, since the toner was superior in fixability, there was little possibility of the image being scratched by rubbing at the time of color overlapping.

EXAMPLE 5

| | |
|---|---|
| Dispersed resin obtained by Preparation Example 1 | 50 g |
| Microlith Black CT (produced by Ciba Co.) | 10 g |
| Isopar H | 100 g |

A mixture of the above composition was dispersed for 24 hours by means of a ball mill to prepare a negative polar concentrated toner. 14 g of said concentrated toner were diluted in 4 l of Isopar H to prepare a liquid developer. Next, an electrostatic latent image was formed on a commercially available electrophotographic copying paper (MRP-600 produced by Ricoh) and developed using this developer. A clear-cut image was reproduced.

This developer was by far superior in re-dispersibility as compared with conventional developers. That is, the developer according to the present invention was left standing for 1 week, and it was found that little sedimentation was caused and the developer could be dispersed again. In contrast, the conventional toner (toner for use in MRP-600 produced by Ricoh) was found to cause heavy sedimentation and further to be unadapted for redispersion.

EXAMPE 6

| | |
|---|---|
| Dispersed resin obtained by Preparation Example 2 | 50 g |
| Tri-iron tetraoxide | 10 g |
| Isopar G | 100 g |

A mixture of the above composition was dispersed for 40 hours by means of a ball mill to prepare a toner for use in magnetic transfer. Next, an electrostatic latent image was formed on a commercially available electrophotographic copying paper and then developed with the toner of the present invention. A transfer paper was placed thereon and transfer was done using a magnet from the side of this paper. About 80% of the toner image was transferred onto the transfer paper. Since the tri-iron tetraoxide used had a large specific gravity, the toner was apt to settle, but was adapted for re-dispersion even if sedimentation occurred.

EXAMPLE 7

| | |
|---|---|
| Dispersed resin obtained by Preparation Example 1 | 25 g |
| Dispersed resin obtained by Preparation Example 2 | 25 g |
| Carbon Black Mitsubishi #100 | 5 g |
| Microlith Blue (produced by Ciba Co.) | 1 g |
| Isopar L | 100 g |

A mixture of the above composition was dispersed for about 60 hours by means of a ball mill to thereby obtain a negative polar toner for use in charge transfer.

Next, an electrostatic latent image was formed on a selenium photo-sensitive plate and developed with the toner of the present invention. A transfer paper was placed thereon to thereby carry out charge transfer. As a result, it was found that about 78% of the toner image was transferred. The transferred image showed a superior fixability.

EXAMPLE 8

| | |
|---|---|
| Dispersed resin obtained by Preparation Example 1 | 30 g |
| Dispersed resin obtained by Preparation Example 2 | 20 g |
| Dye PDB-11 (Alkali Blue produced by Morimura Kemenaron K.K.) | 10 g |
| Isopar G | 100 g |

A mixture of the above composition was dispersed for about 24 hours by means of a ball mill to prepare a negative polar concentrated toner. Next, a liquid developer was prepared by diluting 10 g of this concentrated toner in 2 l of Isopar G. This developer was put in the developing section of the Canon L-7 machine, whereby development was carried out. The image thus obtained was found to be superior in transferability as well as fixability.

EXAMPLE 9

| | |
|---|---|
| (a) Dispersed resin obtained by Preparation Example 2 | 50 g |
| Styrene/2EHMA = 5/5 (60%) | 5 g |
| MA-11 (Carbon produced by Mitsubishi Carbon Co.) | 5 g |
| Isopar L | 100 g |
| (b) Dispersed resin obtained by Preparation Example 1 | 50 g |
| Vinyl toluene/2EHMA = 6/4 (60%) | 10 g |
| Perless-155 Carbon (produced by Columbia Carbon Co.) | 5 g |
| Alkali Blue | 1 g |
| Isopar H | 100 g |
| (c) Dispersed resin obtained by Preparation Example 3 | 38 g |
| Styrene/LMA = 6/4 (60%) | 10 g |
| Conductex SC (produced by Columbia Carbon Co.) | 8 g |
| Reflex Blue (produced by Hochst Gosei K.K.) | 2 g |
| Sovasol (petroleum aliphatic hydrocarbon) | 100 g |
| (d) Dispersed resin obtained by Preparation Example 2 | 50 g |
| MMA/SMA = 5/5 (61%) | 8 g |
| Carbon Black Mitsubishi #44 | 4 g |
| Carbon tetrachloride | 160 g |
| (e) Dispersed resin obtained by Preparation Example 1 | 50 g |
| Conductex SC | 3 g |
| Daifuroil #100 (fluorinated hydrocarbon, produced Daikin Kogyo K.K.) | 80 g |

Each mixture of the above composition (a) to (e) was dispersed for 24 hours by means of a ball mill to prepare a negative polar concentrated toner. 14 g of each concentrated toner were diluted with 4 l of the same solvent as used in situ. Thus, there were prepared 5 kinds of liquid developers. Reproduction was carried out using these developers according to the same procedure as Example 5. Thus, there were obtained clear-cut images respectively.

These developers were found to have an excellent redispersibility, and at the same time were found to be completely freed from the fixing phenomenon of toner to the cleaning section of the copying machine for a long period of time. In this connection, it is to be noted that in (a) to (e), 2EHMA denotes 2-ethylhexyl methacrylate, LMA denotes lauryl methacrylate, and SMA denotes stearyl methacrylate.

EXAMPLE 10

| | |
|---|---|
| Dispersed resin obtained by Preparation Example 4 | 30 g |
| Microlith Blue (produced by Ciba Co.) | 5 g |
| Isopar H | 100 g |

A mixture of the above composition was dispersed for 60 hours by means of a ball mill to prepare a cyan toner for use in color-copying. The resulting toner was found to have a superior transparency, impart a good luster to the image and exhibit a superior color-reproducibility as described in Example 3. Further, as this toner was superior in fixability, there was little possibility of the image being scratched by rubbing at the time of color overlapping.

EXAMPLE 11

| | |
|---|---|
| Dispersed resin obtained by Preparation Example 5 | 50 g |
| Microlith Black CT (produced by Ciba Co.) | 10 g |
| Isopar H | 100 g |

A mixture of the above composition was dispersed for 18 hours by means of a ball mill to prepare a negative polar concentrated toner. 26 g of the resulting concentrated toner were diluted in 2 l of Isopar H to prepare a liquid developer. Next, an electrostatic latent image was formed on a commercially available copying paper (MRP-600 produced by Ricoh) and developed using this developer. A clear-cut image was reproduced.

This developer was by far superior in re-dispersibility as in Example 5 in comparison with conventional developers.

EXAMPLE 12

| | |
|---|---|
| Dispersed resin obtained by Preparation Example 6 | 50 g |
| Tri-iron tetraoxide | 10 g |
| Isopar G | 100 g |

A mixture of the above composition was dispersed for 40 hours by means of a ball mill to prepare a toner for use in magnetic transfer. Next, an electrostatic latent image was formed on a commercially available electrophotographic copying paper and then developed with the toner of the present invention. A transfer paper was placed thereon and transfer was done using a magnet from the side of this paper. About 82% of the toner image was transferred onto the transfer paper.

The toner containing tri-iron tetraoxide was apt to settle, but could be re-dispersed again as in Example 6, even if sedimentation occurred.

EXAMPLE 13

| | |
|---|---|
| Dispersed resin obtained by Preparation Example 8 | 25 g |
| Microlith Blue (produced by Ciba Co.) | 5 g |
| Isooctane | 100 g |

A mixture of the above composition was dispersed for 10 hours by means of a ball mill to prepare a cyan toner for use in color-copying. The resulting toner was found to have a superior transparency, impart a good luster to the image and exhibit a superior color-reproducibility as described in Example 3. Further, since the toner was superior in fixability, there was little possibility of the image being scratched by rubbing at the time of color overlapping.

EXAMPLE 14

| | |
|---|---|
| Dispersed resin obtained by Preparation Example 7 | 50 g |
| Microlith Black CT (produced by Ciba Co.) | 10 g |
| Isopar H | 100 g |

A mixture of the above composition was dispersed for 30 hours by means of a ball mill to prepare a negative polar concentrated toner. 16 g of said concentrated toner were diluted in 4 l of Isopar H to prepare a liquid developer. Next, an electrostatic latent image was formed on a commercially available electrophotographic copying paper (MRP-600 produced by Ricoh) and developed using this developer. A clear-cut image was reproduced.

This developer was by far superior in re-dispersibility as in Example 5 in comparison with conventional developers.

EXAMPLE 15

| | |
|---|---|
| Dispersed resin obtained by Preparation Example 9 | 50 g |
| Tri-iron tetraoxide | 10 g |
| Isopar G | 100 g |

A mixture of the above composition was dispersed for 40 hours by means of a ball mill to prepare a toner for use in magnetic transfer. Next, an electrostatic latent image was formed on a commercially available electrophotographic copying paper and then developed with the toner of the present invention. A transfer paper was placed thereon and transfer was done using a magnet from the side of this paper. About 81.5% of the toner image was transferred onto the transfer paper. The toner containing tri-iron tetraoxide was apt to settle, but could be redispersed as in Example 6, even if sedimentation occurred.

What is claimed is:

1. A liquid developer for use in electrophotography which is prepared by dispersing a toner consisting essentially of a pigment or dye and a resin in a carrier liquid having a high insulating property and a low dielectric constant, wherein said resin is a nonaqueous dispersed resin obtained by effecting, in a nonaqueous solvent comprising an aliphatic hydrocarbon, the steps of:

(a) copolymerizing (1) a monomer A having the general formula I:

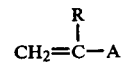

wherein R is —H or —CH$_3$, A is —COOC$_n$H$_{2n+1}$ or —OC$_n$H$_{2n+1}$, and n is an integer of 6 to 20, with (2) a polyfunctional second monomer having two or more double bonds and (3) a third monomer selected from the group consisting of a monomer B having a glycidyl group or a vinyl monomer C having a carboxyl group, (b) esterifying the resulting copolymer with a fourth monomer selected from the group consisting of said monomer B and said monomer C, such that said fourth monomer is said monomer C when said third monomer is monomer B and said fourth monomer is said monomer B when said third monomer is monomer C, and (c) grafting the resulting esterified copolymer with a monomer D selected from the group consisting of styrene, vinyl acetate, vinyltoluene, chlorostyrene, vinylpyrrolidone, vinylpyridine, and compounds having the general formula II:

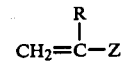

wherein R is the same as defined above and Z is —COOC$_m$H$_{2m+1}$, wherein m is an integer of 1 to 4, —OCOC$_{m'}$H$_{2m'+1}$, wherein m' is an integer of 1 to 6,

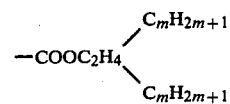

wherein m is the same as defined above, —COOH, —COOC$_2$H$_4$OH or

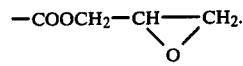

2. A developer according to claim 1 wherein said polyfunctional second monomer is used in an amount of 0.0001 to 0.5 part by weight to 1 part by weight of said monomer A in the step (a), said third monomer is used in an amount of 0.001 to 0.5 part by weight to 1 part by weight of said monomer A in the step (a), said fourth monomer in the step (b) is used in an amount of 0.001 to 0.5 part by weight to 1 part by weight of said copolymer produced in step (a), and said monomer D is used in the step (c) in an amount of 0.01 to 1.0 part by weight to 1 part by weight of said esterified copolymer produced in the step (b).

3. A developer according to claim 1 wherein said polyfunctional second monomer is one member selected from the group consisting of polyfunctional acrylate or methacrylate compounds having the general formula III:

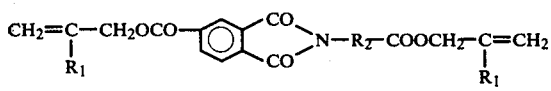

wherein $R_1$, which may be the same or different, is a hydrogen atom or a methyl group, and $R_2$ is a dihydric aliphatic hydrocarbon, alicyclic hydrocarbon or aromatic hydrocarbon radical; compounds having the general formula VI:

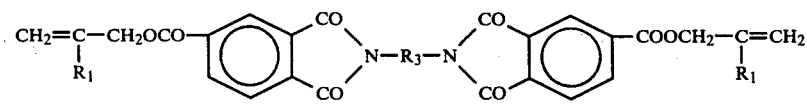

wherein $R_1$ is the same as defined in the general formula III, and $R_3$ is a dihydric aliphatic radical excluding a substituted or non-substituted methylene group, an alicyclic radical or an aromatic hydrocarbon radical; and compounds having the general formula V:

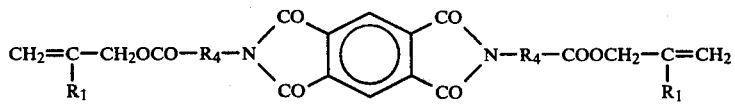

wherein $R_1$ is the same as defined in the general formula III, and $R_4$ is a dihydric aliphatic radical, an alicyclic radical or an aromatic hydrocarbon radical.

4. A developer according to claim 1 further comprising a wax-like substance selected from the group consisting of a wax having a softening point of 60° to 130° C. and a low molecular weight polyolefin.

5. A developer according to claim 1 wherein said carrier liquid has a resistance of at least $10^9$ $\Omega$cm and a dielectric constant not greater than 3.

6. A developer according to claim 1 or claim 3 wherein the specific gravity of said resin is in the range of 0.85 to 1.05.

7. A developer according to claim 1 wherein said toner is in the form of approximately uniform particles having diameters in the range of 0.2 to 1.0µ.

* * * * *